United States Patent
Gay et al.

(10) Patent No.: US 10,425,672 B2
(45) Date of Patent: Sep. 24, 2019

(54) TIME OFFSET DATA REQUEST HANDLING

(71) Applicant: Home Box Office, Inc., New York, NY (US)

(72) Inventors: Allen Arthur Gay, Shoreline, WA (US); Sata Busayarat, Seattle, WA (US)

(73) Assignee: HOME BOX OFFICE, INC., New York, NY (US)

( * ) Notice: Subject to any disclaimer, the term of this patent is extended or adjusted under 35 U.S.C. 154(b) by 0 days.

(21) Appl. No.: 15/148,943

(22) Filed: May 6, 2016

(65) Prior Publication Data
US 2017/0324986 A1    Nov. 9, 2017

(51) Int. Cl.
| | |
|---|---|
| *H04N 21/266* | (2011.01) |
| *H04L 29/08* | (2006.01) |
| *H04N 21/231* | (2011.01) |
| *H04N 21/258* | (2011.01) |
| *H04N 21/454* | (2011.01) |

(52) U.S. Cl.
CPC ....... *H04N 21/266* (2013.01); *H04L 67/1036* (2013.01); *H04N 21/23106* (2013.01); *H04N 21/25816* (2013.01); *H04N 21/4542* (2013.01)

(58) Field of Classification Search
CPC ......... H04N 21/2541; H04N 21/25875; H04N 21/4627

USPC .......................................... 725/93, 116, 146
See application file for complete search history.

(56) References Cited

U.S. PATENT DOCUMENTS

| | | | | |
|---|---|---|---|---|
| 5,442,390 A | * | 8/1995 | Hooper .............. | H04N 7/17318 348/E7.071 |
| 9,519,590 B1 | * | 12/2016 | Armangau .......... | G06F 12/0871 |
| 2009/0249222 A1 | * | 10/2009 | Schmidt ............. | H04N 21/2368 715/751 |
| 2012/0084455 A1 | * | 4/2012 | McCue ................ | H04N 21/235 709/231 |
| 2014/0298368 A1 | * | 10/2014 | Raman ............. | H04N 21/25816 725/25 |
| 2015/0134724 A1 | * | 5/2015 | Hao ........................ | H04L 65/60 709/203 |

* cited by examiner

*Primary Examiner* — Mulugeta Mengesha
*Assistant Examiner* — Franklin S Andramuno
(74) *Attorney, Agent, or Firm* — Amin, Turocy & Watson, LLP

(57) ABSTRACT

The described technology is directed towards obtaining and returning time offset data instead of current data in response to a data request. The time offset data may be limited to privileged clients only, and only provided thereto when desired, using a time offset value set by the client, for example. For example, a privileged user may request time offset data corresponding to a future time so as to preview how the data may be presented at a future time. Time offset data may be used by a system entity to fill a cache, e.g., as secondary cached data that may be used once primary cached data expires.

20 Claims, 12 Drawing Sheets

TIME OFFSET DATA REQUEST HANDLING

BACKGROUND

Content providers, such as those that stream video content to subscribers, provide their subscribers with selection data on an interactive user interface. This typically includes user interface elements such as menus and icons/tiles representing the available content, e.g., movies and television shows, with which users can interact to select content for playing. To this end, designers on an editorial team or the like may layout the various menus and/or select image sizes, resolutions, text and so on for the interactive icons/tile that represent the content, including determining colors, sizing items and so on.

One difficulty in designing such interactive user interface selection data is that there are many different types of client devices that users may use to interact and view. The user interface elements that may look good on one device, e.g., a tablet or smartphone with a relatively small screen, may not look good on another device, such as a large ("ten-foot viewing distance") television display, and vice-versa.

Another design difficulty results from needing to protect the program content and selection data from early viewing. A regular subscriber who is not a member of the editorial team or the like needs to be blocked from seeing any content ahead of the release time, that is, before the content provider wants to make that piece of content available. If a future show that has not yet been officially released to the public accidentally becomes available, even temporarily, some users can view the show, possibly copy and disseminate it and so on, while other users will be frustrated because they will hear of the release but not be able to view the content until the appropriate time. Similarly, even if the viewable content itself is not available, a user who sees a selection icon/tile for a show that is blocked will be frustrated upon interacting in an attempt to view it.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, aspects of the technology described herein are directed towards obtaining time offset data. One or more aspects are directed towards receiving a request for data and determining that the request is associated with a time offset value. Time offset data is obtained, based upon the time offset value, from a data source that contains the time offset data. The time offset data is returned in response to the request Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards providing authorized users such as designers with access to data planned for a future release, before unauthorized users are given access to that data. Among other benefits, this allows designers to modify the appearance of user interface selection data elements, such as schedules, menus, icons/tiles and so forth, to arrange and plan for what such data will look like at a future date.

In one or more implementations, the authorization is based upon the user credentials, and is independent of any particular device. As a result, designers can use different devices and modify the selection data for each device, so that a smartphone, tablet, gaming console, large television and so on each may appear in a different way with respect to the selection data.

In one aspect, time travel data also may be used to preload a cache with future data. When the "normal" (non-future) data in the cache expires, the future data is used. This allows a cache to remain useful even when a significant number of its cached items otherwise expire.

It should be understood that any of the examples herein are non-limiting. For instance, some of the examples refer to returning program-related catalog items, such as built from various data sources to represent television content such as movies or shows. However, the technology described herein is independent of any particular type of data being retrieved. Further, the technology described herein is exemplified with respect to a front-end/client facing service (a data retrieval service) and a back-end service (a data service) that returns data to the front-end data retrieval service when needed; however, this is only one implementation, and a single data service that operates to respond to client requests without separate front-end and back-end services may benefit from the technology described herein. As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used in various ways that provide benefits and advantages in computing and data retrieval in general.

Figure 1:
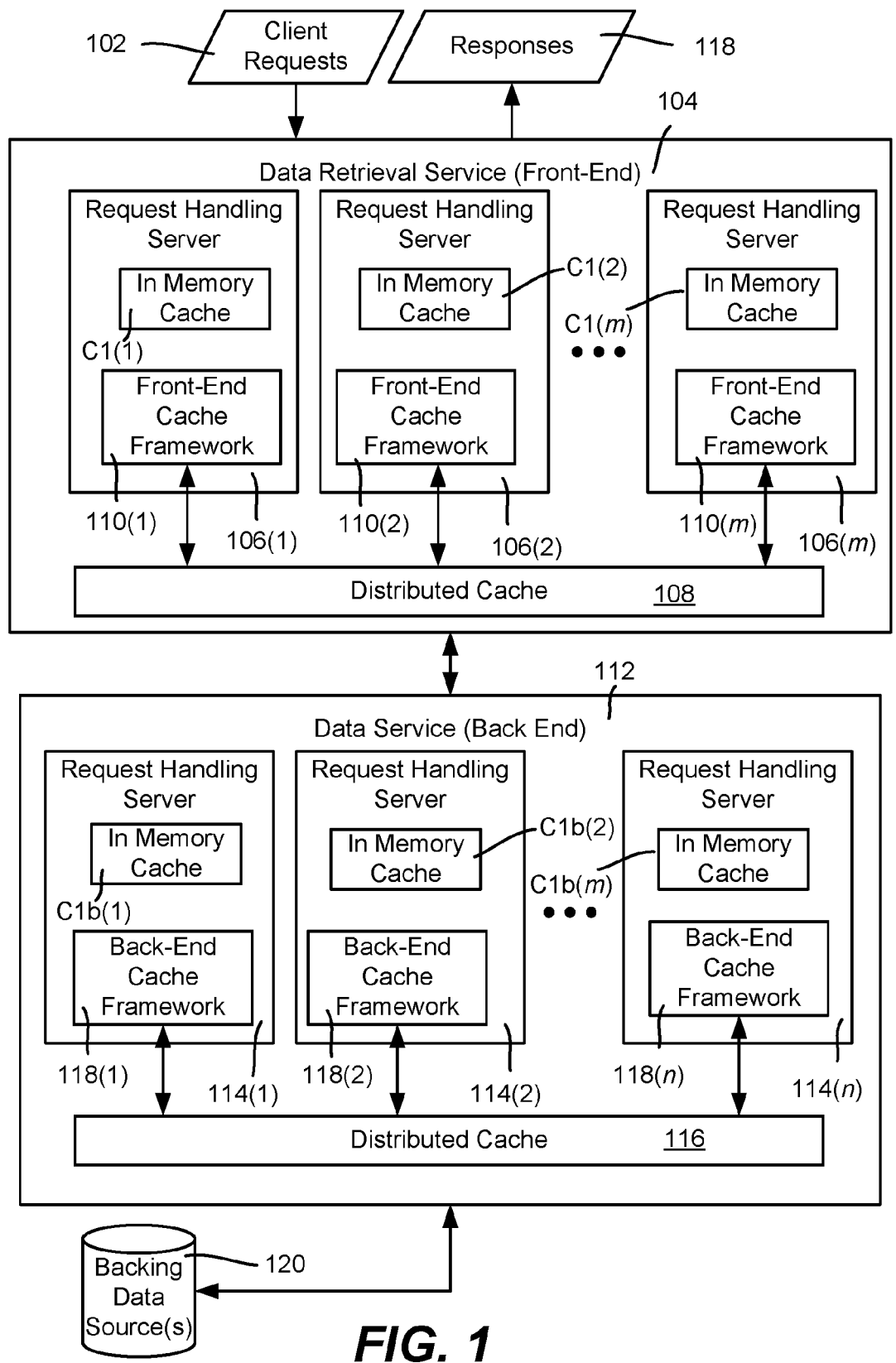
FIG. 1 is an example block diagram representation of components that handle requests for data, including requests for time offset ("time travel") data, according to one or more example implementations.

FIG. 1 is a block diagram representing example components that may be used to provide and work in conjunction with time-offset data requests as described herein. In FIG. 1, client requests 102 are received at a (e.g., front-end) data retrieval service 104. One such data retrieval service 104 comprises a cluster of generally load-balanced server machines 106(1)-106(m), where m represents any practical number of server (virtual and/or physical) machines. In one or more implementations, the load-balanced server machines 106(1)-106(m) each have an in memory cache, C1(1)-C1(m), respectively.

Also shown in FIG. 1 is a distributed cache 108, e.g., a REDIS cache shared among the request handling servers 106(1)-106(m). In a typical implementation, the distributed cache 108 is larger than the individual in-memory caches C1(1)-C1(m) and has a higher hit rate; however the distributed cache 108 takes longer to access, e.g., needing a network request and response. In general, in one or more implementations, each request handling server, e.g., the server 106(1), has a respective cache framework 110(1) that attempts to retrieve data from the server's in-memory cache C(1) when available, and then from the distributed cache 108 if not. If still not available, the front-end data request handling server 106(1) contacts the back-end data service 112 to obtain the requested data. As will be understood, however, caching-related operations are bypassed when dealing with time-offset data retrieval with respect to user-initiated requests.

Thus, further shown in FIG. 1 is a data service 112 (e.g. a back-end service) that is coupled to one or more backing data sources 120. In one or more implementations, the data service 112 comprises a cluster of generally load-balanced server machines 114(1)-114(n), where n represents any practical number of such server (virtual and/or physical) machines. In one or more implementations, the load-balanced data server machines 114(1)-114(n) each have an in memory cache C1b(1)-C1b(n), respectively (where b stands for back-end to differentiate these caches from those memory caches C1(1)-C1(m) of the front-end request handling servers). A back-end service level distributed cache 116 likewise is typically provided. Back-end cache frameworks 118(1)-118(n), which are generally similar to that of the front-end cache frameworks, are used in one or more implementations; note however that a cache miss at the back-end level caches C1b(1)-C1b(n) and distributed cache 116 result in the backing data source(s) 120 being accessed for the data, rather than contacting another data service; such backing data sources 120 may be configured with an interface/wrapper or the like so as to be considered another cache (a "virtual cache") to the back-end cache frameworks 118(1)-118(n). If wrapped in this way, the cache frameworks know to use this "highest cache" for time-offset data requests as described herein.

As described herein, a client device request that is for time offset data does not use the caches. Further, a regular (non-time offset) client request sometimes results in a cache miss or a cache hit of expired data. When a request handling server (e.g., 106(1)) knows that it needs to build the data, e.g., a dataset of one or more data items, in one or more implementations the back-end data service 112 is invoked to provide any needed item or items. Note that a request for some data, such as a tile representing a television show, may need to be composed from multiple data requests for items, possibly from different data sources, e.g., a tile's content may be built from text such as a title and rating, the lead actor's name, a representative image, and so on.

If time-offset data is being requested by a client device, the back-end data service 112 likewise does not use its actual caches, whereby the back-end data service 112 makes requests to the backing data source(s) 120 to obtain the data. The backing data source(s) 120 are also accessed for regular (non-time offset) client requests that cannot be satisfied from a back-end data cache. Again, such backing data sources may be configured to appear to be the "highest" cache in a tiered cache configuration.

Figure 2:
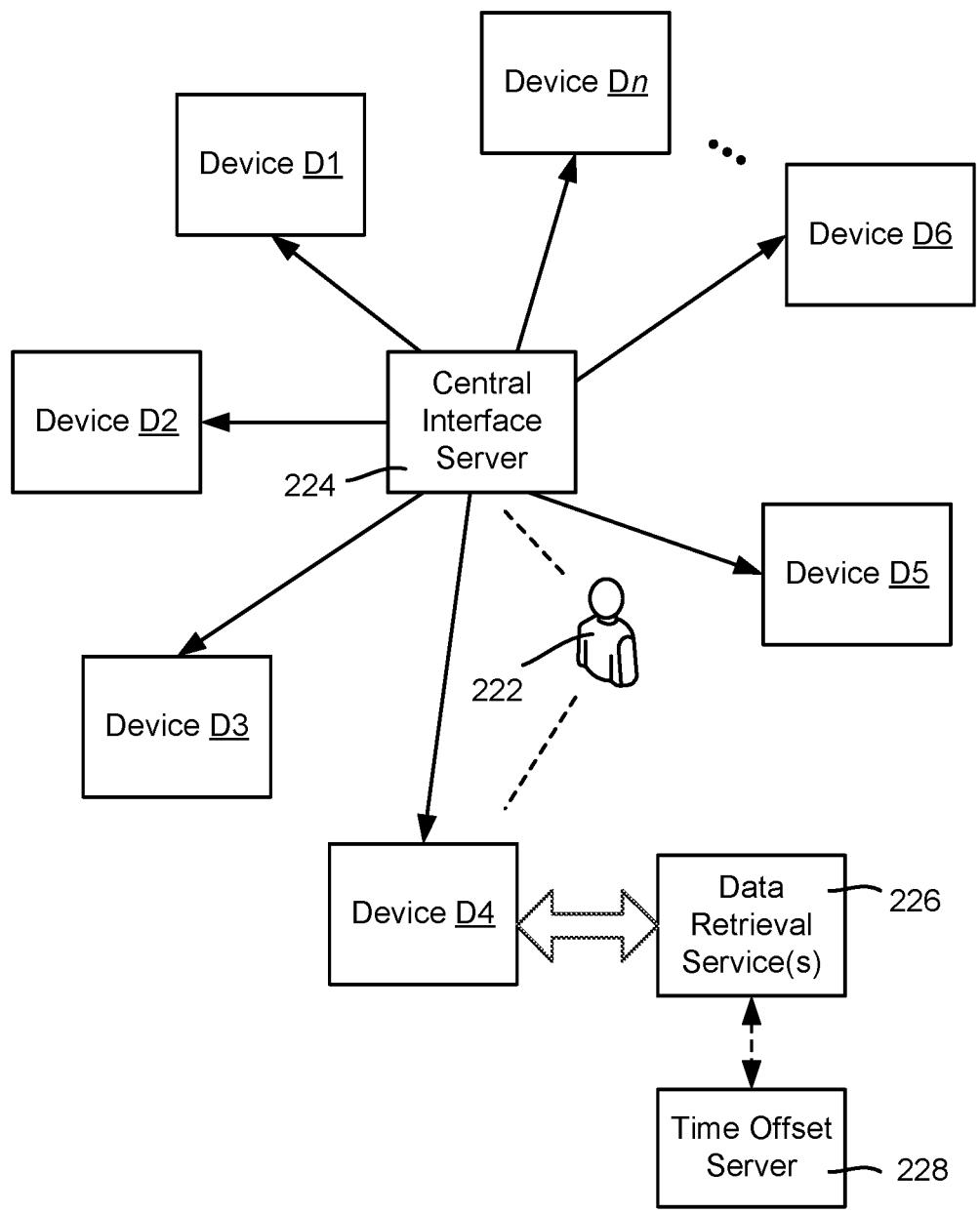
FIG. 2 is an example block diagram representation of a user authorized to retrieve time offset data for use with any number of devices, according to one or more example implementations.

FIG. 2 is a block diagram showing a user 222 having time offset ("time-travel") privileges who is interacting with a central interface server 224, by which the user is able to indicate a desired time offset value, which as described herein in one or more implementations is associated with the user's identity. A time-travel value may be an adjusted time value relative to the current time (e.g., forty-eight hours from the current time) or an actual time in the future (or past) for which time offset data exists and is retrievable. The time offset server may limit the time offset values to only values for which time offset data exists and is retrievable. Typically, future data is desired, however it is feasible to set a time offset that goes back in time to see past data, such as if the user wants to see what some user interface looked like in the past, e.g., to use that as a starting point for some new design. Note that "user" as described herein with respect to having time time-travel privilege(s) also includes the concept of a user "group" or the like, e.g., a user ID may be part of a group (or actually may provide a group ID) that has the time-travel privilege(s). A "requesting entity" or "client" refers to a user or some other entity such as a system component (e.g., process or the like) that can make requests for data, possibly including requests for time offset data.

As described herein, once the user 222 is authenticated via his or her credentials as having time-travel privileges, e.g., on the central interface server 204 and/or on a device D4 from among a set of service-capable client devices D1-Dn, requests to the data retrieval services 226 (e.g., via the front-end data retrieval server 104 of FIG. 1) are communicated to a time offset server 228. If the user has set a time-travel value on the server 228, this time-travel value is returned to the data retrieval services, from where the time value is used to retrieve data based upon the time-travel value for this user. If a time-travel value is not set by the user 222, the user 222 is basically treated as a regular, non-time travel user. This allows the user to have one identity and either be a time-travel user when desired, or be a regular, non-time travel user when not desired. Notwithstanding, this is only one alternative, and different implementations may use different user identities to accomplish the same time travel on/off effect.

The time-travel data retrieved for a user may be preserved per user identity. By way of example, consider that one time-travel user is designing a future user interface for viewing on a laptop computing device, e.g., device D3. The time-travel user can make changes, such as to select a style for a given tile that represents that tile's corresponding content well, and looks good on typical laptop screens. A different user can select a different style without changing the other user's choice. A supervisor or the like, e.g., a team lead or committee, can review each design and choose which one to use. In this way, different time-travel users such as designers can operate in parallel without interfering with each other's work.

Moreover, the data retrieval service can reformat general data based upon the device in use (as well as the software version of the program running on the device that displays the data). In this way, for example, some future set of data may be formatted to appear one way on a tablet device's display, and another way when appearing on a gaming and entertainment console's display. This means designs can be previewed with future data on each device type. Notwithstanding, it is feasible to simulate different device types to an extent on a different device type, e.g., a personal computer may be able to emulate another device.

Figure 3:
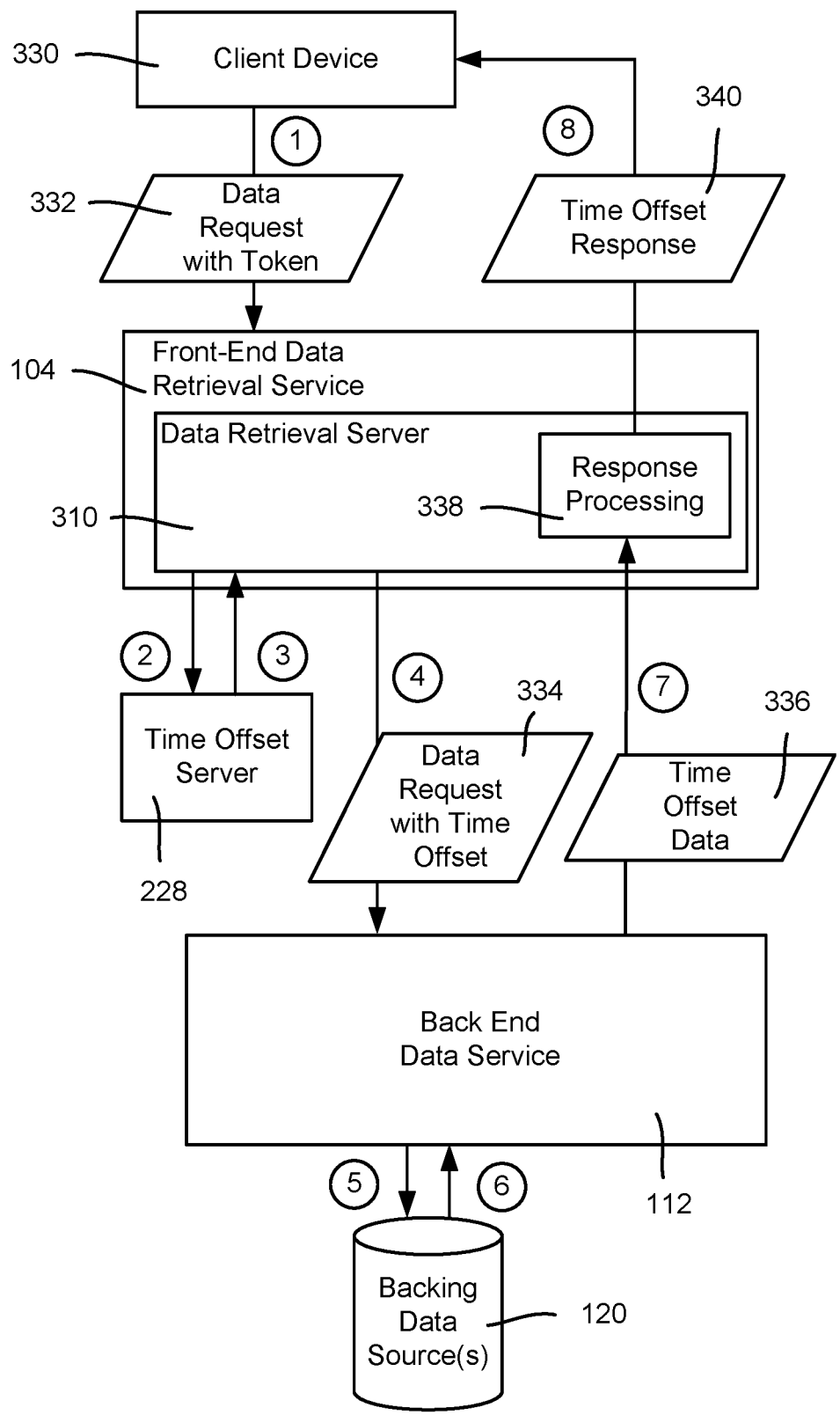
FIG. 3 is an example block diagram and data flow representation of components configured to handle a request for time offset data with an appropriate response, according to one or more example implementations.

FIG. 3 shows additional details of handling a client request when time travel is activated for a user. A user on a client device 330 sends a request 332 for data with a token that indicates that the user has time-travel privileges. This is represented in FIG. 3 via the arrow labeled one (1). The token is received during user authentication, as generally described herein.

When the front-end data retrieval service 102 receives the request, e.g., as handled by one of its load balanced servers (310 in FIG. 3), the server 310 recognizes from information in the token that the user has time-travel privileges. The server thus communicates with the time offset server 228 to obtain the time-travel value, if any, that the user has set for time offset data. This is represented in FIG. 3 via the arrows labeled two (2) and three (3).

In the example of FIG. 3, the user has requested a time-travel value, and thus the data request (block 334) includes the time-travel value. Because caches are not used with a user's time-travel data (as doing so would use non-time travel data as well as cache undesired time offset data), the request is not able to be handled at the front-end level's caches, and thus the request is sent with the time offset value to the back-end data service (the arrow labeled four (4)).

The back-end data service 112 also recognizes (e.g., from the time offset value or other suitable flag) that the request is not able to be handled by its actual caches, and thus the back-end data service requests the needed data, at the desired time offset, from the one or more data sources 120, and receives the requested data item or items. This is represented in FIG. 3 via the arrows labeled five (5) and six (6). Thereafter, the back-end data service 112 composes the time offset data 336 and returns the data 336 to the data retrieval server 310 (arrow seven (7)). Write through caching is not performed with this time offset data at the back-end level.

In one or more implementations, the time offset data 336 is independent of the requesting client device type/software version being run on that device. As a result, the data retrieval server 310 includes response processing logic 338 that formats the data for the particular client device in use, including its software version. The result is a time offset response 340 returned to the client device 330 (arrow eight (8)). Note that alternative implementations can return data from a back-end service that is already formatted and thus does not need such device-specific processing. Again, write through caching is not performed with this time offset data at the front-end level.

Figure 4:
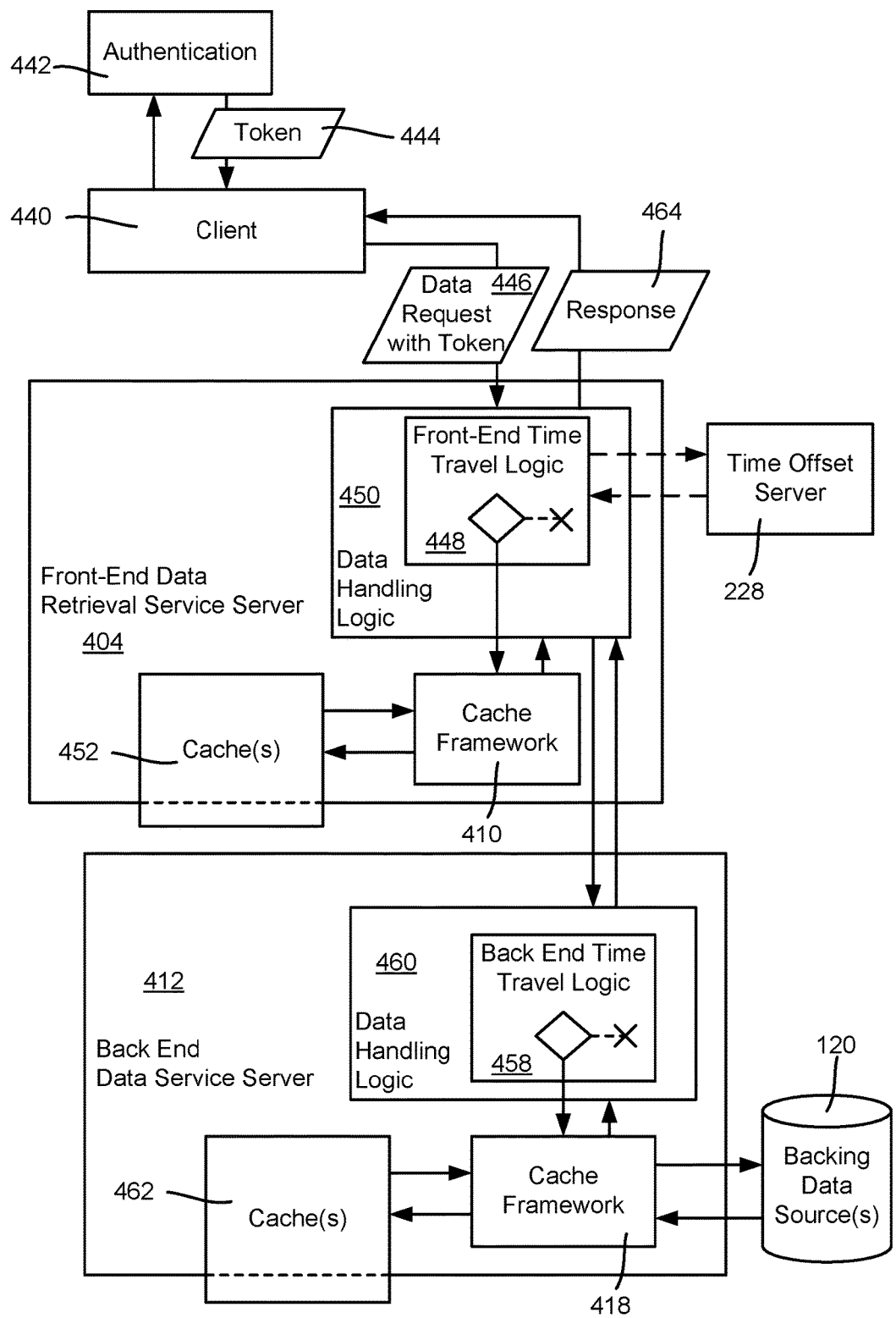
FIGS. 4 and 5 are an example block diagram representations of components configured to handle a request for data when time offset data is not requested (FIG. 4) versus when time offset data is requested (FIG. 5), according to one or more example implementations.
Figure 5:
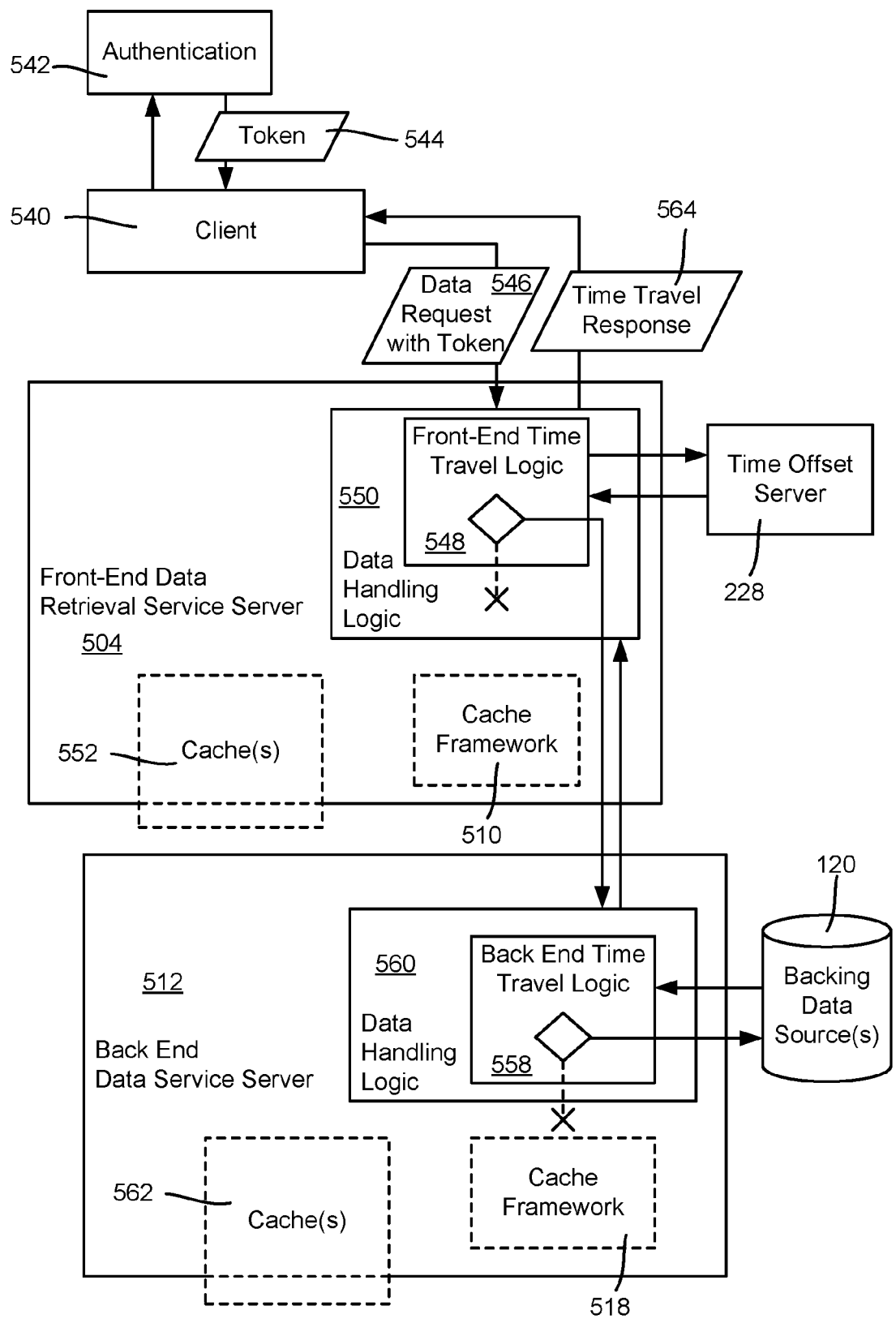

FIGS. 4 and 5 show additional details of request handling via a front-end server 404 and back-end server 412. In FIG. 4, there is no time travel value set, whereas in FIG. 5, there is a time travel value set.

Thus, in the example of FIG. 4 when a user of a client device 440 authenticates (block 442), the user gets back a token 444. Consider that in this example the user has time-travel privileges, and thus when a data request 446 is made, the token is recognized by front-end time travel logic 448 of general data handling logic 450 of the server 404 as having time-travel privileges.

As described herein, the presence of the privilege data in the token triggers a call to the time offset server 228. In this example, there is no time offset value set by the user, and thus the time offset server 228 does not return a time travel-modified time. When this occurs, the server 404 operates as generally described above with reference to FIG. 1, e.g., the server invokes a cache framework 410 to look for data in its in-memory cache, and if not found or expired, then in the distributed cache, shown collectively in FIG. 4 as caches 452. If found the data is returned from a cache as described herein.

If not found, the front-end server 404 forwards the data request to the back-end service, where a back-end server 412 similarly includes back-end time travel logic travel logic 458 of general data request handling logic 460. Again, because time travel is not in use in FIG. 4, the back-end server 412 uses its cache framework 418 to look in one or more of its cache(s) at the back-end level, shown collectively as cache(s) 462. If not cached, data is returned from one or more of the backing data sources 120. In any event, the requesting client receives an appropriate response 464.

It should be noted that FIG. 4 also may be used to represent a situation in which the user does not have a token containing time travel privileges. A difference from the above-described example is that without the privilege, the time offset server 228 need not be contacted at all by the front-end time travel logic (as indicated by the dashed, rather than solid, arrows to and from the time offset server 228 in FIG. 4). Thus, the request is returned from a front-end cache if the data is available there, a back-end cache if not available in the front-end cache but available in a back-end cache, or from the backing data sources 120 if not cached in any cache (or is expired).

In the example of FIG. 5 there is a time-travel value set by an authorized user. Thus, when a user of a client device 540 authenticates (block 542), the user gets back a token 544. Because in this example the user has time-travel privileges, when a data request 546 is made, the token 546 is recognized by front-end time travel logic 548 of general data handling logic 550 of the server 504 as giving time-travel privileges.

As described herein, the presence of the privilege data in the token triggers a call to the time offset server 228. In this example, there is a time offset value set by the user, and thus the time offset server 228 returns a time travel-modified time or offset. When this occurs, the server 504 operates as if there are no caches in the system.

Thus, the front-end server 504 forwards the data request to the back-end service, where a back-end server 512 similarly includes back-end time travel logic travel logic 558 of general data request handling logic 560. Again, because time travel is now in use in FIG. 4, the back-end server 512 bypasses its actual caches and uses the backing data sources 120 for the requested data, corresponding to the requested time. In this way, the requesting client receives an appropriate time travel response 564.

It should be noted that the time travel logic at the front-end server, back-end server or both servers may be implemented in each respective cache framework in an implementation that uses cache frameworks. For example, a cache framework may recognize the time-travel value and instead of accessing any actual cache or caches, automatically take the same path as if a cache miss occurred. A cache framework also may be designed to not update/write through time-travel offset data to its cache or caches. As can be readily appreciated, there are various alternative ways to implement the time travel logic.

Figure 6:
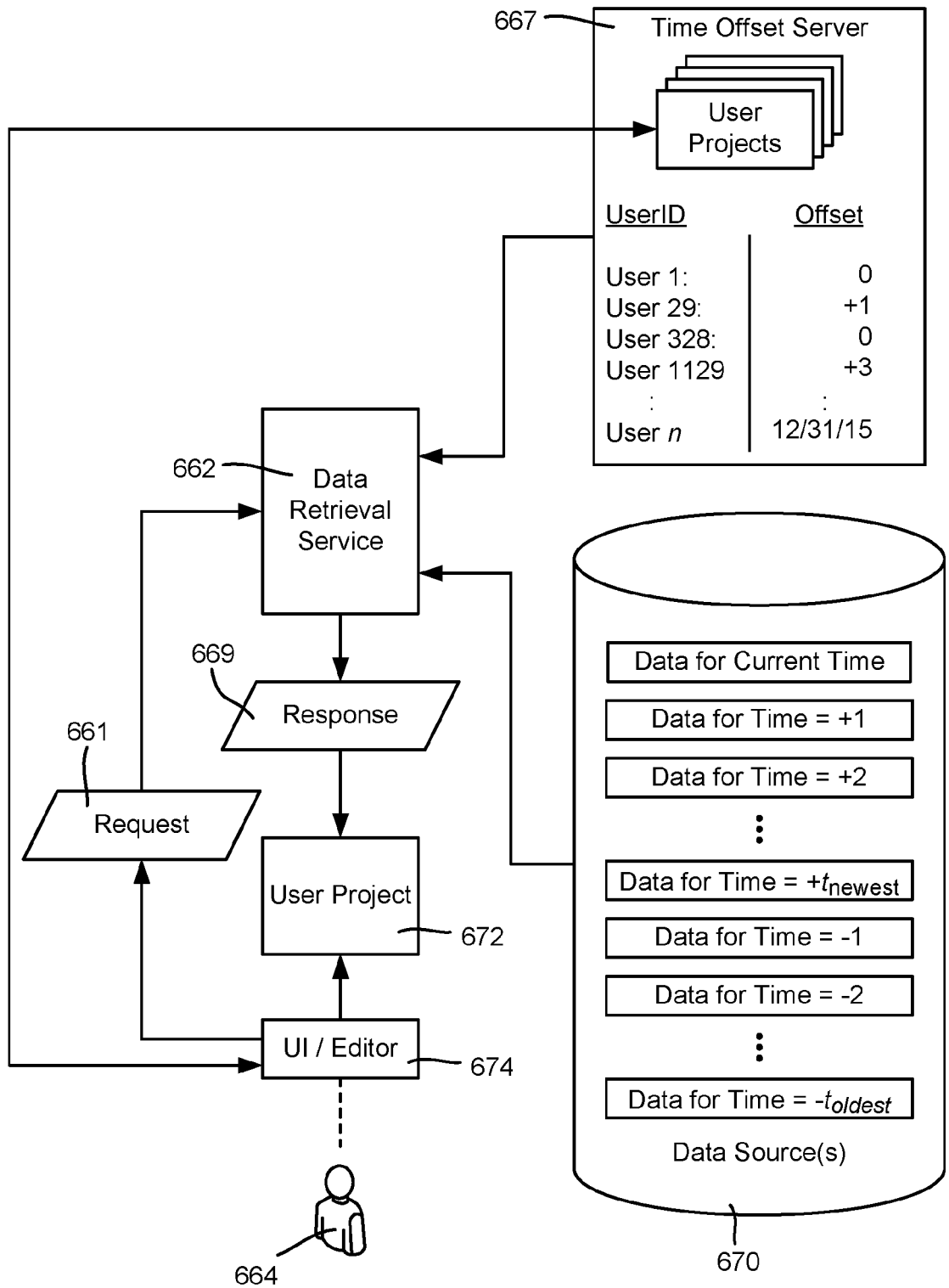
FIG. 6 is an example representation of how user time offset time values and data including time offset data may be maintained and used, according to one or more example implementations.

FIG. 6 is an example representation of how time-travel data may be maintained for access by authorized users. In one or more implementations as described herein, when a request 661 is received at a data retrieval service 662, the service 662 recognizes via the token (not separately shown) associated with the request 661 that the user 664 that made the request 661 is authorized to receive time offset data. The data retrieval service 662 communicates with a time offset server 667 to determine whether the user 664 has a time offset value set for the user ID; (note that a database lookup or the like may be a function of the time offset server 667).

If the authorized user 664 has a non-zero (or non-NULL or the like) time offset value, the time offset server 667 provides that value to the data retrieval service 662. Otherwise the time offset server 667 may return some indication (e.g., a zero, NULL, a return code or the like) that the user does not want time offset data returned, whereby the user is basically treated the same as non-authorized users with respect to data requests, e.g., only receiving data based upon the current time of the request. Note that an alternative to maintaining values of zero, NULL or some other non-time offset value for users that have not set an offset time is to only maintain entries for users having actual, non-zero time-offset values associated therewith.

A response 669 containing the requested data may be returned as described herein. In general, for authorized users without a time offset value, to respond to the request the data retrieval service 662 obtains data from one or more in-memory and/or data service level caches and/or one or more data sources 670 based upon the current time. For authorized users with a time offset value, to respond to the request the data retrieval service 662 obtains data from the one or more data sources 670 based upon the offset time.

The time offset data may be maintained in any number of ways in the one or more data sources 670. For example, time offset data may be associated with a timestamp or the like, with the data closest to a user's requested time offset being found and returned. Another way is to limit the available offset times that are offered so as to match what data is available as well as to not maintain too much data, e.g., data may be maintained on a per-day basis, up to the newest date available such as two weeks from today, and going back in time on a daily basis up to some oldest date maintained; thus users in such a scheme may request time offset data within a one-day time window. Instead of one day, some other time window such as an hour may be used. Still further, the time windows may vary, e.g., with respect to how close to the current time they are, such as to maintain data in one-hour time windows for data within one week of the current time, and within one-day time windows for data more than a week old or beyond a week in the future, and so forth.

FIG. 6 also exemplifies one way in which a time-travel user 664 may interact with time offset data. For example, a user 664 may work on a project 672 to design and/or edit a menu of next week Sunday's planned television programming. The user 664 interacts via a user interface (UI)/editor 674 to obtain the time offset data corresponding to next week Sunday's television programming, and to save the data as part of a retrievable project or the like on a per-user (or per-group or the like) basis, e.g., as maintained in the time offset server (or at some other suitable location). In this way, a user with time offset privileges can perform tasks related to future data, such as to prototype a set of data to be presented to other (e.g., non-time offset privileged) users at a future time; e.g., to arrange an upcoming programming menu with style data such as color data, item size and so forth to preview the menu's appearance.

Figure 7:
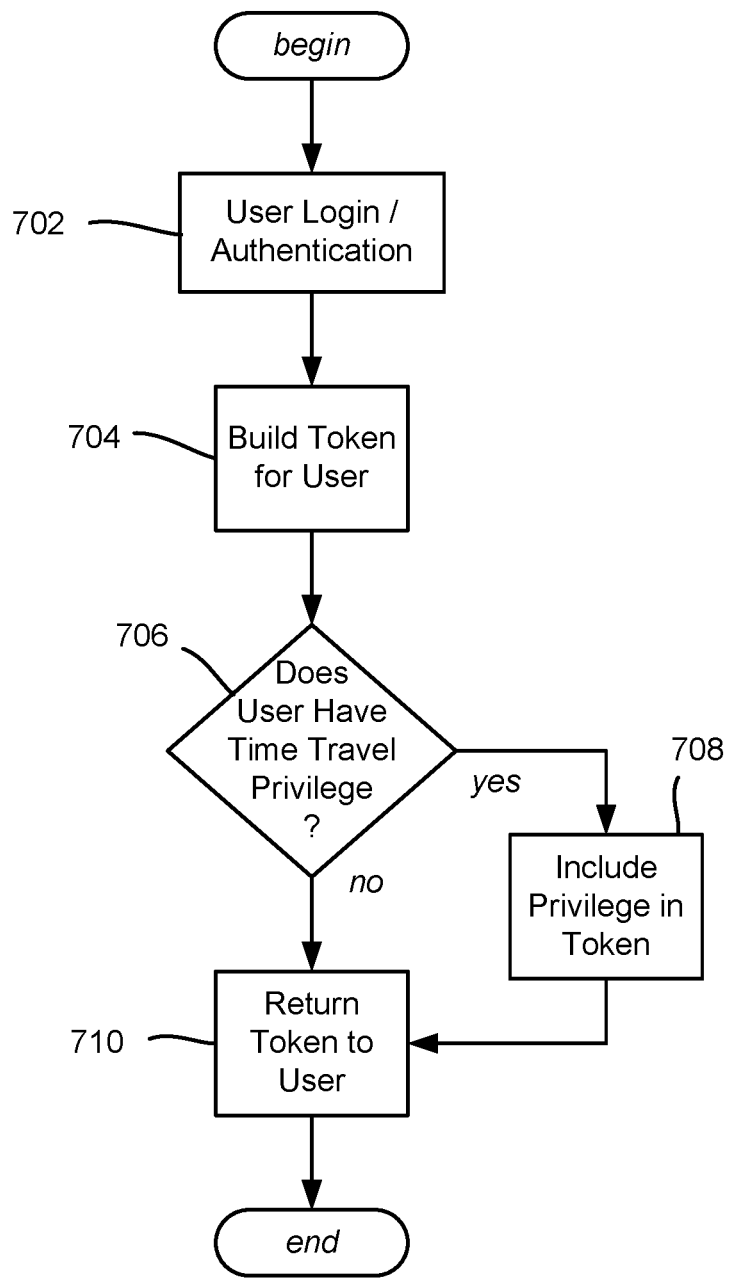
FIG. 7 is a flow diagram showing example logic/steps that may be taken to authenticate a user with time travel privilege, according to one or more example implementations.

FIG. 7 is a flow diagram showing example steps that may be taken by a user to obtain a token. When the user logs in to authenticate (step 702), a token is started to be built for the user. If the user has time-travel privileges as evaluated at step 706, the token includes an indication of the privilege (step 708), otherwise the token does not include such an indication. Once built, step 710 returns the token to the user.

Figure 8:
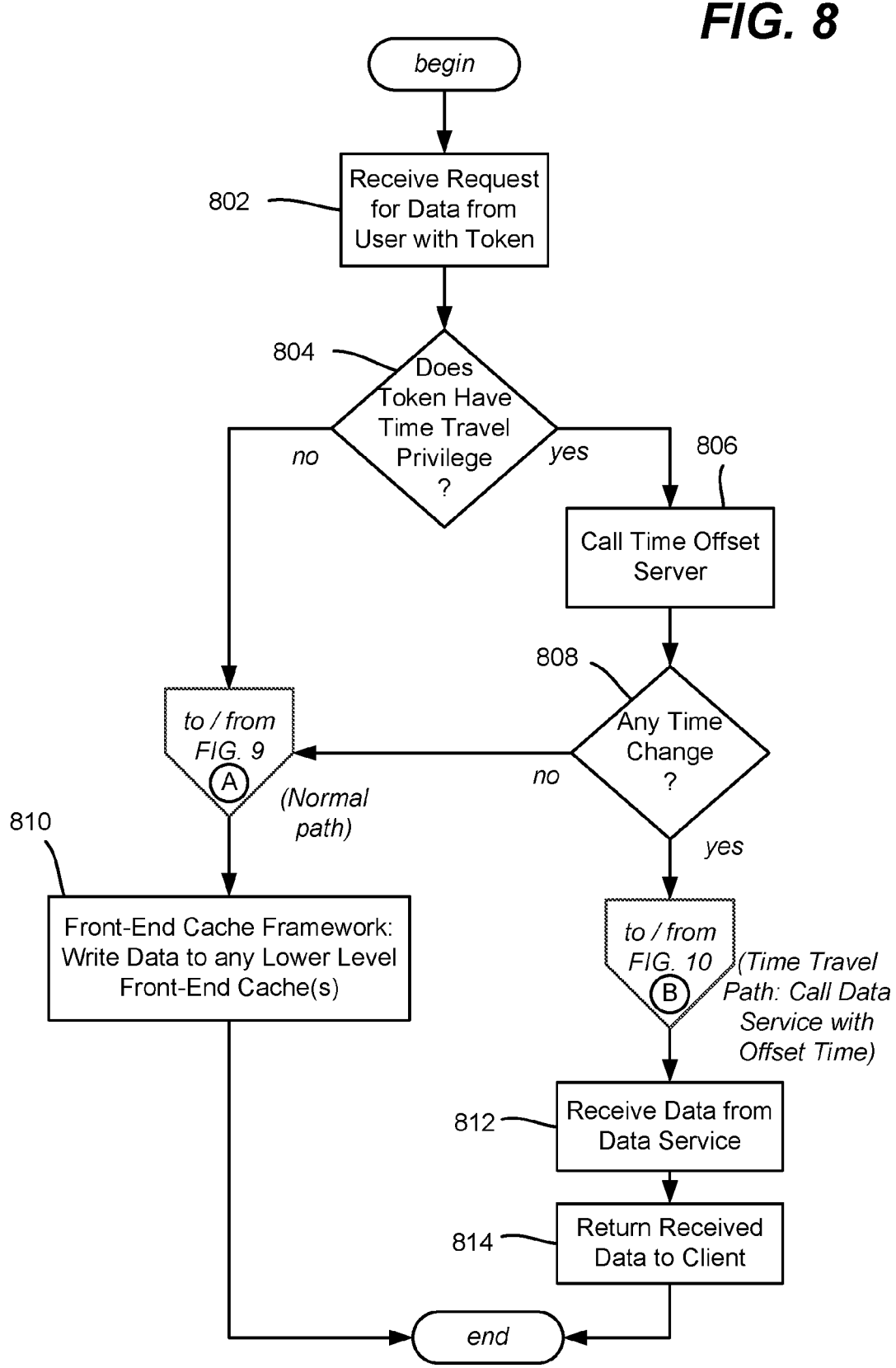
FIGS. 8 and 9 are flow diagrams showing example logic/steps that may be taken by a front-end server when dealing with requests for data, including requests for time travel data, according to one or more example implementations.
Figure 9:
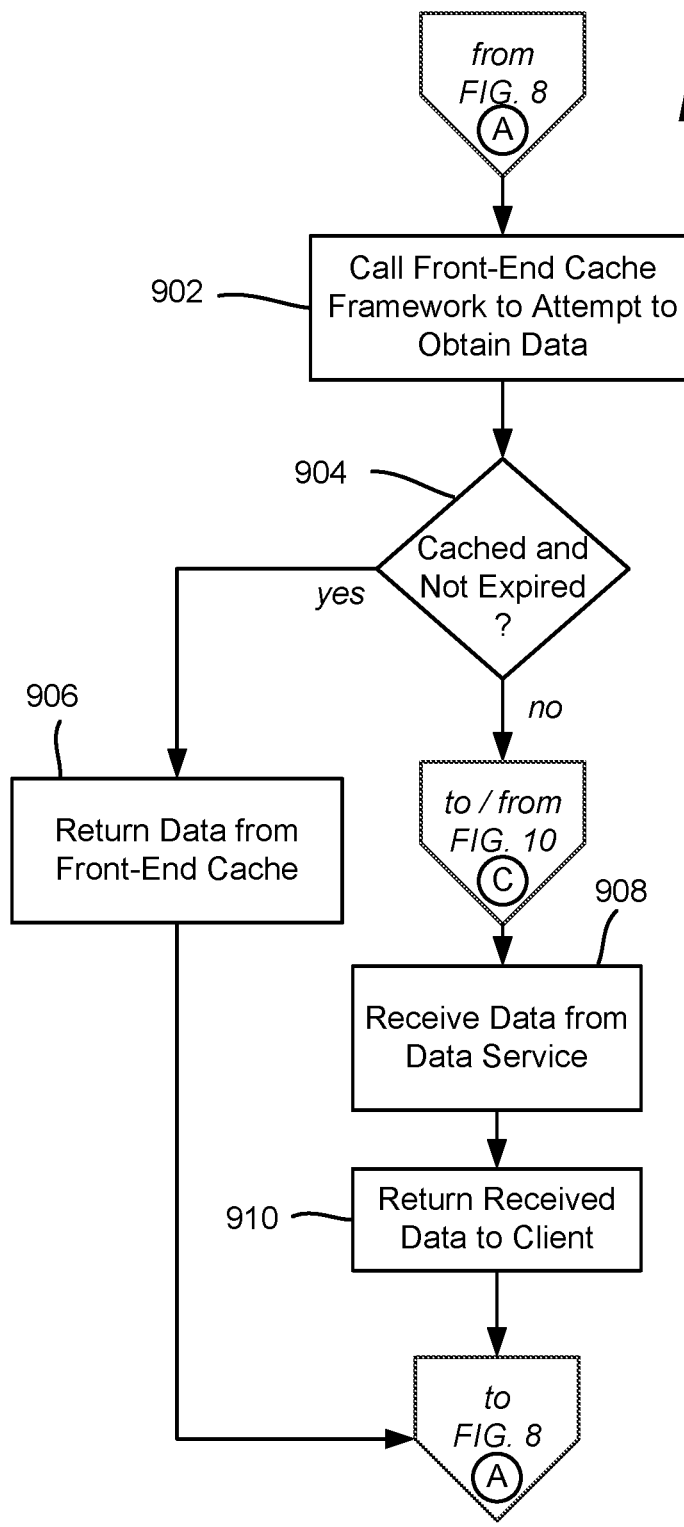
Figure 10:
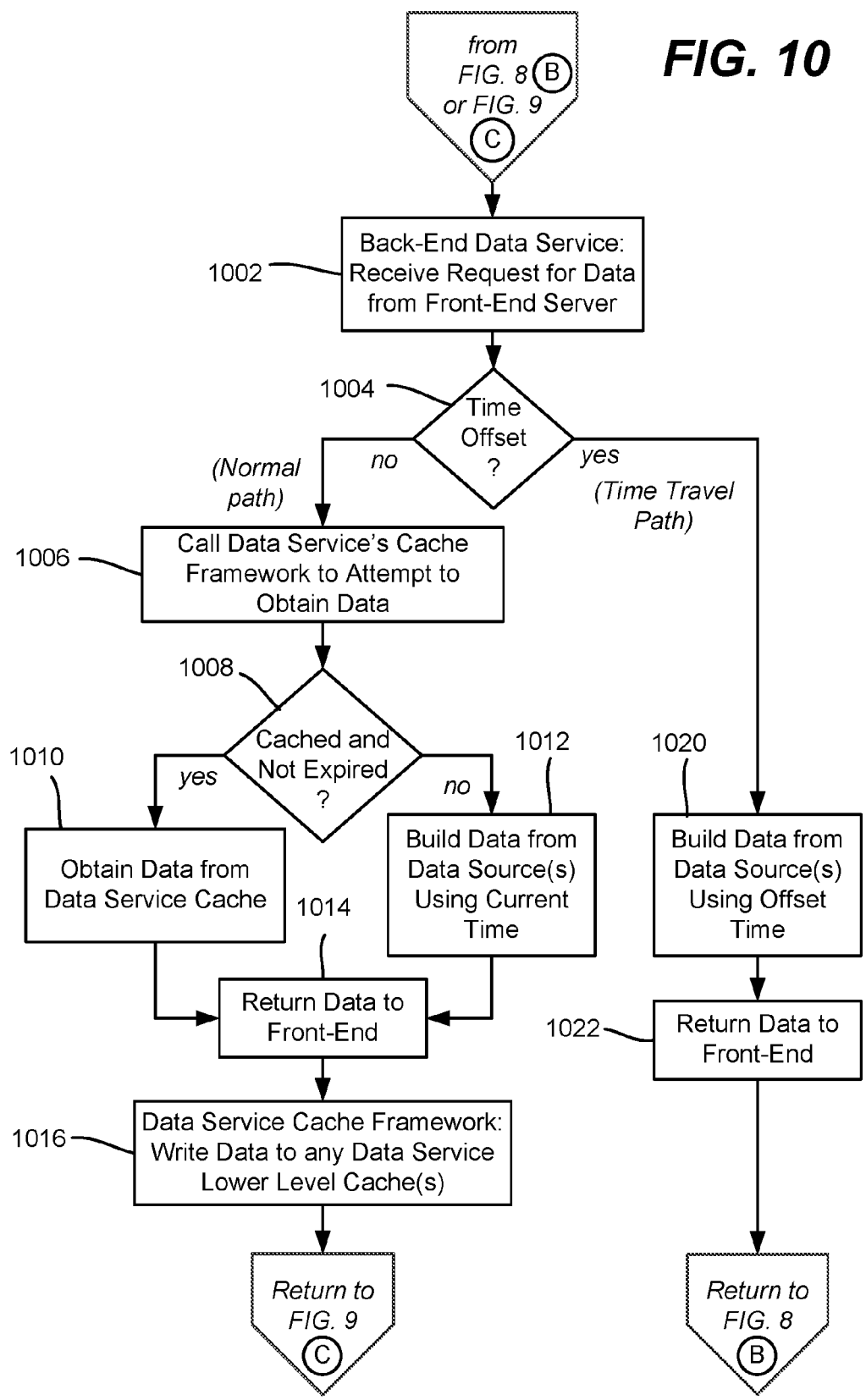
FIG. 10 is a flow diagram showing example logic/steps that may be taken by a back-end server when dealing with requests for data, including requests for time travel data, according to one or more example implementations.

FIGS. 8-10 are example flow diagrams related to handling a user request based upon whether the user has time travel privileges, and if so, whether the user has set a time travel value. FIGS. 8 and 9 generally describe example operations handled by the front-end server, while FIG. 10 generally describes example operations handled by a back-end server.

Step 802 of FIG. 8 represents receiving a request for data from the user, with the request accompanied by a token. Step 804 represents evaluating the token for time travel privileges. If present, step 806 represents calling the time offset server. Step 808 then checks for whether the user has made a time travel value change.

If there is no time travel privilege or a user with time travel privilege has not set a time change, step 804 or step 808 branch to point A, where the steps of FIG. 9 are executed starting from step 902, e.g., to begin looking for cached data. If there is a time-travel privilege (step 804) and the user with time-travel privileges has set a time change (step 808), the steps of FIG. 10 corresponding to point B are executed.

Note that FIG. 8, including step 804, is only one scheme for obtaining time offset values for authorized users, which is likely efficient because communication with the time offset server only occurs for what is likely to be a relatively small subset of the total users. One alternative is to call the time travel service for all users, while allowing only those time-travel privileged users to set an offset time value. Yet another alternative is to maintain a replicated copy at the data retrieval service of the information that indicates which users have non-zero time offset values along with each of their time offset values. In any event, the data retrieval service has access to a data store of time offset values associated with requesting entities (e.g., authorized users), whether access to the data store is indirect via communication with a time offset server or in some other manner, possibly via more direct access to a database copy or the like.

FIG. 9 represents general example operations of the front-end server, beginning at step 902 where the front-end cache framework is invoked to attempt to obtain the data from a cache. If found cached and not expired at step 904, step 906 returns the data from a (front-end) cache, and returns to step 810 of FIG. 8. Step 810 of FIG. 8 represents performing front-end write through operations, e.g., to update any lower level cache with the found data; (if found in the front-end in-memory cache, there is no write through needed).

If not found in a front-end cache, step 904 branches (point C) to step 1002 of FIG. 9 to pass the request to the back-end data service, where the request is handled by a suitable back-end server. FIG. 1002 represents receiving the request.

Step 1004 evaluates whether there is a time offset associated with the request. If not, step 1006 invokes the back-end data server's cache framework to look for the data. If found cached and not expired at step 1008, the data is obtained from the cache at step 1010 and returned to the front-end server at step 1014. Otherwise the data is built from the data sources at step 1012. Back-end cache write through operations are performed at step 1016, which returns to FIG. 9 step 908 (point C).

FIG. 9 step 908 receives the data from the back-end server, and step 910 returns the data to the client (after formatting as appropriate). FIG. 9 step 910 then returns to step 810 of FIG. 8 to perform the front-end cache write through operations, e.g., to update the front-end caches with the data from the back-end server.

Returning to FIG. 8, step 808, when there is a time-travel change, the example steps of FIG. 10 are again executed (via Point B). In this iteration, however, step 1004 recognizes the time change. Thus, cache-related operations are bypassed, and the data built from the backing data source or sources at step 1020.

Step 1022 returns the data to the front-end in response to the request, and returns to FIG. 8, step 812, which represents the front-end server receiving the data from the back-end server. Step 814 returns the data to the client (after formatting as appropriate). Note that FIG. 8 in this example ends without performing any cache write through operations, because time travel offset data is not to be cached (for client device-initiated time travel requests).

As can be seen, a time-travel authorized user can receive data that is set for release at a future (or past) time. This allows for previewing, editing, designing and so forth while using the same data services that regular users use. With the same data services, regular, unauthorized users are not able to use (and likely not even aware of) time-travel capabilities, while time-travel authorized users can act as regular users by not setting a time offset value.

Figure 11:
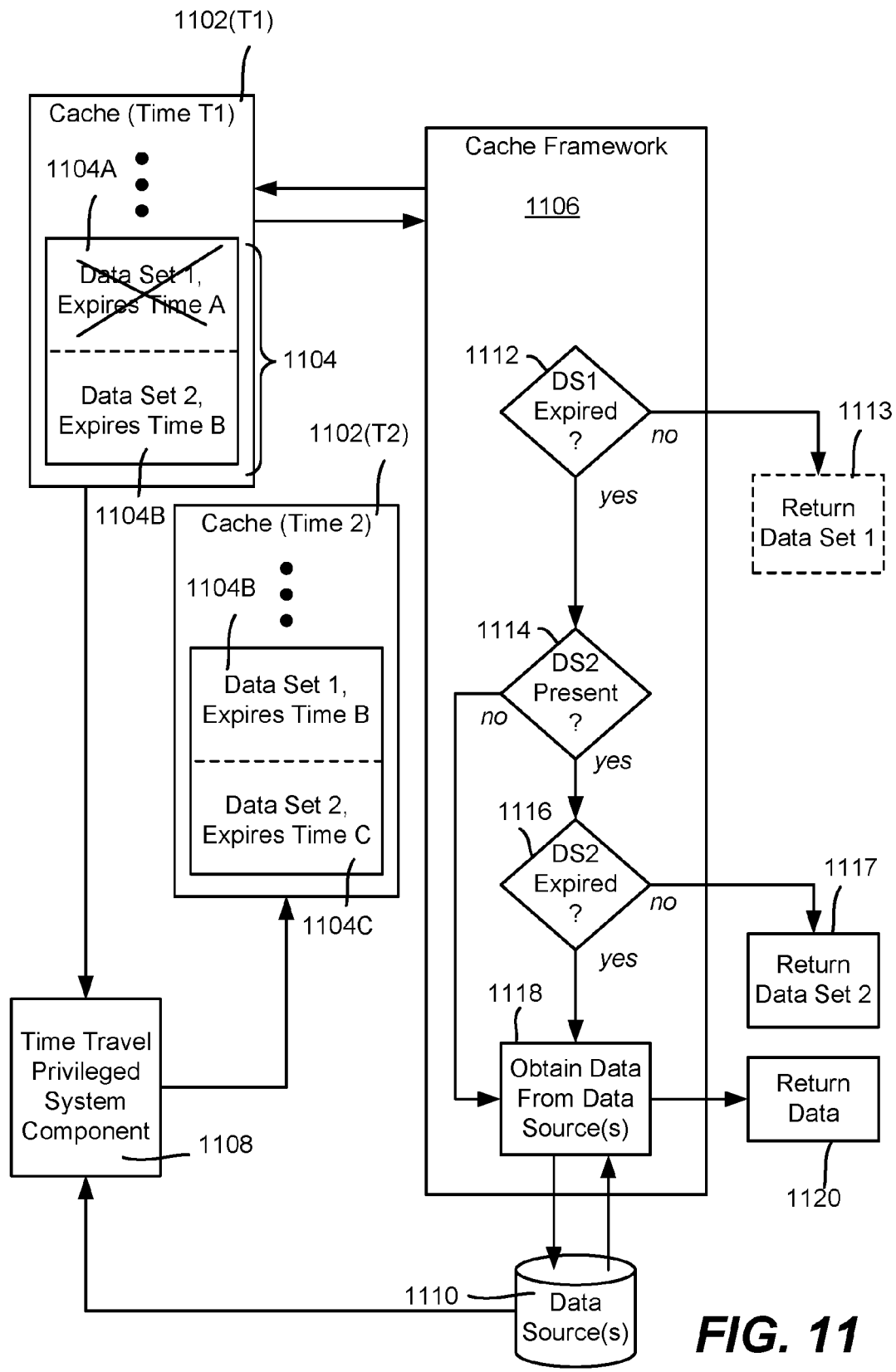
FIG. 11 is a block/logic diagram showing time travel data used with respect to caching future data, according to one or more example implementations.

Turning to another aspect, FIG. 11 shows another alternative use for time travel, namely caching future data. By way of example, consider that cached data has up to two sets of data per cached item, each with its own expiration time; (note that there may be more than two sets, however only two sets are exemplified in FIG. 11). This is represented in FIG. 11 by a cache 1102(T1) at time T1, having cached data item 1104 comprising one set 1104A with a conventional expiration time A, and another set 1104B with a future expiration time B.

One reason for using this scheme is for when a lot of data is set to expire at a certain time, such as when a new show is being released. Instead of detecting that data is expired and thereby hitting the data sources with a great deal of requests at that time, a dual expiration caching mechanism may be employed. In general, if a first set of cached data for a request is expired, then the dual expiration caching mechanism checks a second set of cached future data, e.g., maintained as the same cached "item" together with the first set. The second set comprises a future set of data, pre-populated in the cache via a time travel-privileged system component 1108 using future data from the data source(s) 1110.

Thus, consider that the cache framework 1106 of FIG. 11 accesses the data item 1104 for a request, and determines (decision block 1112) that data set 1104A is expired; (if not expired, the data set 1 (DS1) is returned at block 1113 and the retrieval is done). If expired, instead of having to further request the data from some other source, the cache framework 1106 checks the second data set 11048 and determines that such data exists and is not expired (decision blocks 1114 and 1116). Thus, the data set 2 (DS2), which is no longer future data, is returned (block 1117). Only if the data set 2 is not found or found and expired does the cache framework (or other entity at block 1118) obtain the data from the data sources 1110 for returning at block 1120. Note that in one or more implementations, the cache framework may not deal directly with multiple data items per cache entry; instead a component such as a cache decorator pattern that wraps such a cache with respect to access requests may include the decision making logic to return the appropriate data to the cache framework. However, for purposes of explanation, the cache framework returns the correct data, whether directly or indirectly in conjunction with one or more other components.

When the time travel privileged system component 1108 is later run, the data set 11048 becomes the first data set, and a new future data set 1104C becomes the second data set with future data and a future expiration time C. In this way, time travel can be used to pre-populate a cache with future data so that even when the regular cached data expires, the cache contains information that saves resources.

Thus, the second, future set of data is returned until it expires, and basically the second set of cached data becomes the "first" set of data. At some time (e.g., before this "first" set expires, a new second set is then repopulated with future data obtained via time travel requests by the time travel-privileged system component.

As can be seen, there is provided a technology for obtaining time offset data. The time offset data may be limited to privileged clients only, and only provided when desired. The time offset data may be used by a user to prototype how the data may be presented in the future, and may be used by a system entity to fill a cache, e.g., as secondary cached data that may be used once primary cached data expires.

One or more aspects are directed towards receiving a request for data and determining that the request is associated with a time offset value. Time offset data is obtained, based upon the time offset value, from a data source that contains the time offset data. The time offset data is returned in response to the request.

Determining that the request is associated with a time offset value may include determining that request is from a user that is authorized to receive time offset data. Determining that request is from a user that is authorized to receive time offset data may comprise evaluating information in a token received in association with the request. Determining that the request is associated with a time offset value may comprise accessing a time offset data store; the time offset value may be obtained from the time offset data store. Accessing the time offset data store may comprise communicating with a time offset server. Obtaining the time offset data from the data source that contains the time offset data may include bypassing cache access operations.

The time offset value may be set by a requesting entity and maintained at a time offset server. Described is communicating with the time offset server to obtain the time offset value for the requesting entity from which the request is received. The time offset time may be set by a requesting entity as an actual time, or as an adjusted time relative to a current time.

The request may be from a system component that is authorized to receive time offset data. The time offset data received in response to the request may be used to pre-populate a cache based upon the time offset data.

One or more aspects are directed towards a data store of time offset information, in which the data store maintains information corresponding to time offset values associated with at least some requesting entities. A data retrieval service receives a request for data from a requesting entity and responds to the request; the data retrieval service is coupled to the time offset data store to obtain a time offset value when a non-zero time offset value is associated with the requesting entity. The data retrieval service is coupled to one or more data sources to obtain time offset data based upon the time offset value to respond to the request.

The non-zero time offset value may be associated with the requesting entity based upon the requesting entity being authorized with a time offset privilege and the requesting entity having set the non-zero time offset value.

The data retrieval service may receive another request for data from another requesting entity and respond to the other request, in which no non-zero time offset value is associated with the other requesting entity. The data retrieval service may be coupled to one or more data sources to obtain data based upon a current time to respond to the request.

The data store of time offset information may be coupled to the data retrieval service via a time offset server. The time offset data may be used to prototype a set of data to be presented at a future time.

One or more aspects are directed towards receiving a client request for data, determining that the client is authorized to receive time offset data and determining whether the client has chosen to receive time offset data. If the client has chosen to receive time offset data, aspects include obtaining the time offset data from a data source that contains the time offset data and returning the time offset data in response to the request. If the client has not chosen to receive time offset data, aspects include obtaining data based upon a current time and returning the data in response to the request.

Determining that the client is authorized to receive time offset data may comprise evaluating a token associated with the request. Determining whether the client has chosen to receive time offset data may comprise determining whether the client has a non-zero time offset value associated therewith.

When the client has chosen to receive time offset data, obtaining the time offset data may include bypassing cache-related operations of a data retrieval service that handles client requests for data.

The client may choose to receive time offset data, and the time offset data may be stored in a cache.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 12 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 12:
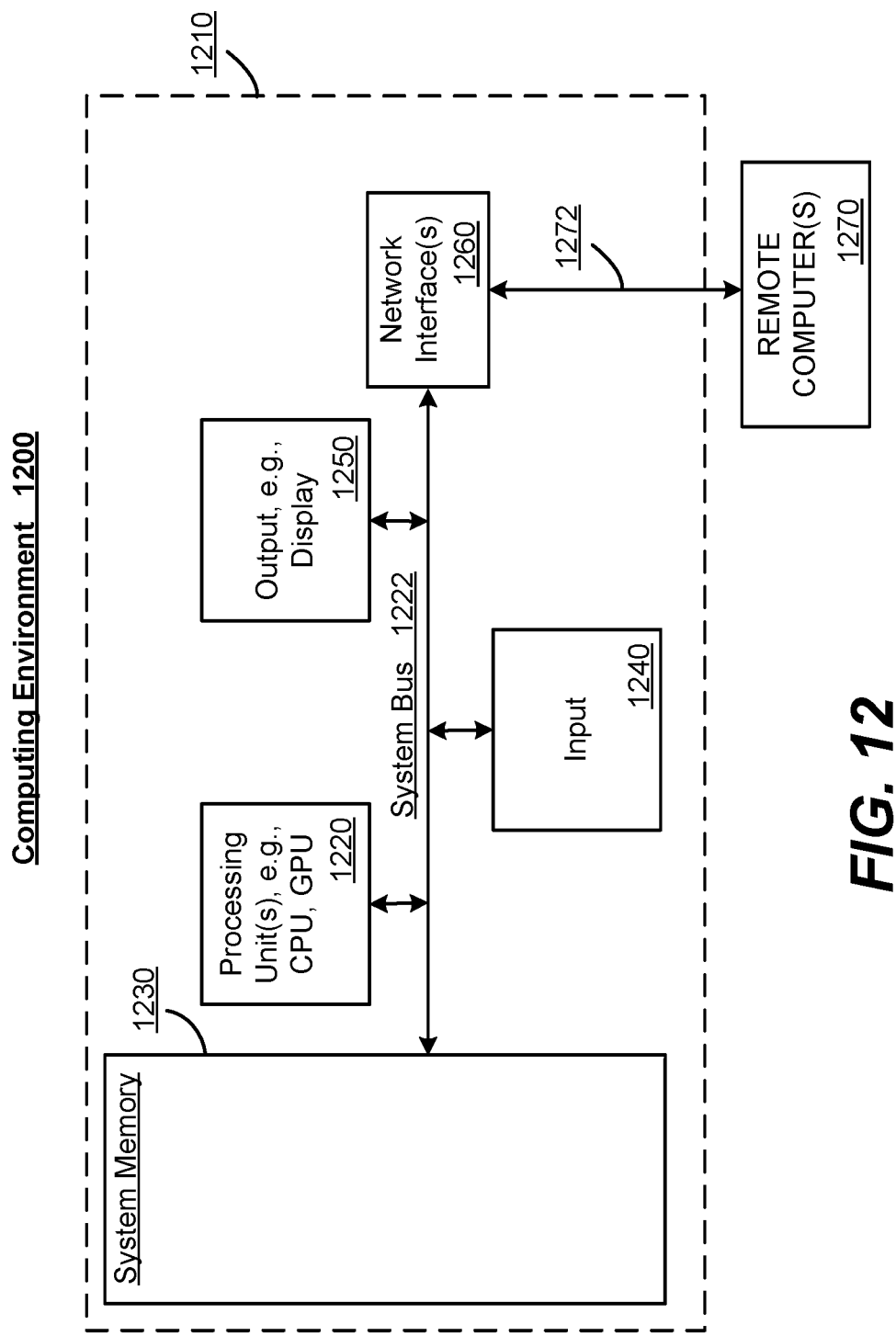
FIG. 12 is a block diagram representing an example computing environment into which aspects of the subject matter described herein may be incorporated.

FIG. 12 thus illustrates an example of a suitable computing system environment 1200 in which one or aspects of the implementations described herein can be implemented, although as made clear above, the computing system environment 1200 is only one example of a suitable computing environment and is not intended to suggest any limitation as to scope of use or functionality. In addition, the computing system environment 1200 is not intended to be interpreted as having any dependency relating to any one or combination of components illustrated in the example computing system environment 1200.

With reference to FIG. 12, an example device for implementing one or more implementations includes a general purpose computing device in the form of a computer 1210. Components of computer 1210 may include, but are not limited to, a processing unit 1220, a system memory 1230, and a system bus 1222 that couples various system components including the system memory to the processing unit 1220.

Computer 1210 typically includes a variety of machine (e.g., computer) readable media and can be any available media that can be accessed by a machine such as the computer 1210. The system memory 1230 may include computer storage media in the form of volatile and/or nonvolatile memory such as read only memory (ROM) and/or random access memory (RAM), and hard drive media, optical storage media, flash media, and so forth. By way of example, and not limitation, system memory 1230 may also include an operating system, application programs, other program modules, and program data.

A user can enter commands and information into the computer 1210 through one or more input devices 1240. A monitor or other type of display device is also connected to the system bus 1222 via an interface, such as output interface 1250. In addition to a monitor, computers can also include other peripheral output devices such as speakers and a printer, which may be connected through output interface 1250.

The computer 1210 may operate in a networked or distributed environment using logical connections to one or more other remote computers, such as remote computer 1270. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1272, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method comprising:

receiving, by system including a processor, a request from a client device for user interface elements associated with a user interface, wherein the system comprises a first set of user interface elements and at least one second set of user interface elements associated with the user interface, wherein the first set of user interface elements are designated as currently available to a set of users, and wherein respective second sets of the at least one second set are designated as available at respective future times to the set of users;

determining, by the system, whether the request is associated with a time offset value and associated with a user that is authorized with a time offset privilege;

in response to determining that the request is associated with the time offset value and associated with the user that is authorized with the time offset privilege, obtaining, by the system, a second set of user interface elements of the at least one second set based upon the time offset value, and transmitting, by the system, the second set of user interface elements to the client device to initiate display of the second set of user interface elements in the user interface on the client device prior to the future time designated for the second set of user interface elements; and in response to determining that the request is not associated with the time offset value and not associated with the user that is authorized with the time offset privilege, obtaining, by the system, the first set of user interface elements, and transmitting, by the system, the first set of user interfaces to the client device to initiate display of the first set of user interface elements in the user interface on the client device.

2. The method of claim 1, wherein the obtaining the second set of user interface elements comprises selecting the second set, from the at least one second set, having an associated designated future time corresponding to the time offset value.

3. The method of claim 1, wherein the determining whether the request is associated with the user that is authorized with the time offset privilege comprises evaluating information associated the user in a token received in association with the request.

4. The method of claim 3, wherein the determining whether the request is associated with the time offset value comprises determining that the time offset value is associated with the user in a time offset data store, and further comprising obtaining the time offset value associated with the user from the time offset data store.

5. The method of claim 1, wherein the obtaining the second set of user interface elements comprises selecting the second set, from the at least one second set, having an associated designated future time closest to the time offset value.

6. The method of claim 1, wherein the obtaining the second set of user interface elements comprises bypassing cache access operations of the system.

7. The method of claim 1, wherein the time offset value is set by the user that is authorized to receive time offset data and maintained at a time offset server, and further comprising communicating with the time offset server to obtain the time offset value.

8. The method of claim 1, further comprising maintaining the time offset value as an actual time or as an adjusted time relative to a current time.

9. The method of claim 1, further comprising determining that request is from a system component that is authorized to receive time offset data.

10. The method of claim 1, wherein the obtaining the first set of user interface elements comprises obtaining the first set from.

11. A non-transitory computer-readable medium having instructions stored thereon that, in response to execution, cause a system including a processor to perform operations comprising:
receiving a client request from a client device for user interface elements associated with a user interface, wherein the system comprises a first set of user interface elements and at least one second set of user interface elements associated with the user interface, wherein the first set of user interface elements are designated as currently available to a set of users, and wherein respective second sets of the at least one second set are designated as available at respective future times to the set of users;
determining whether the client request is associated with a time offset value and associated with a user that is authorized with a time offset privilege;
in response to determining that the client request is associated with the time offset value and associated with the user that is authorized with the time offset privilege, obtaining a second set of user interface elements of the at least one second set based upon the time offset value, and transmitting the second set of user interface elements to the client device to initiate display of the second set of user interface elements in the user interface on the client device prior to the future time designated for the second set of user interface elements; and
in response to determining that the client request is not associated with the time offset value and not associated with the user that is authorized with the time offset privilege, obtaining the first set of user interface elements, and transmitting the first set of user interfaces to the client device to initiate display of the first set of user interface elements in the user interface on the client device.

12. The non-transitory computer-readable medium of claim 11, wherein the determining whether the client request is associated with the user that is authorized with the time offset privilege comprises evaluating information associated the user in a token received in association with the client request.

13. The non-transitory computer-readable medium of claim 11, wherein the obtaining the second set of user interface elements comprises selecting the second set, from the at least one second set, having an associated designated future time corresponding to the time offset value.

14. The non-transitory computer-readable medium of claim 11, wherein the obtaining the second set of user interface elements comprises selecting the second set, from the at least one second set, having an associated designated future time closest to the time offset value.

15. The non-transitory computer-readable medium of claim 11, wherein the obtaining the second set of user interface elements comprises bypassing cache access operations of the system.

16. A system comprising:
a processor; and
a memory communicatively coupled to the processor, the memory having stored therein computer-executable instructions, comprising:
a response processing component configured to:
receive a client request from a client device for user interface elements associated with a user interface, wherein the system comprises a first set of user interface elements and at least one second set of user interface elements associated with the user interface, wherein the first set of user interface elements are designated as currently available to a set of users, and wherein respective second sets of the at least one second set are designated as available at respective future times to the set of users;
determine whether the client request is associated with a time offset value and associated with a user that is authorized with a time offset privilege;
in response to a determination that the client request is associated with the time offset value and associated with the user that is authorized with the time offset privilege, obtain a second set of user interface elements of the at least one second set based upon the time offset value, and transmit the second set of user interface elements to the client device to initiate display of the second set of user interface elements in the user interface on the client device prior to the future time designated for the second set of user interface elements; and
in response to a determination that the client request is not associated with the time offset value and not associated with the user that is authorized with the time offset privilege, obtain the first set of user interface elements, and transmit the first set of user interfaces to the client device to initiate display of the first set of user interface elements in the user interface on the client device.

17. The system of claim 16, wherein the response processing component is further configured to determine whether the client request is associated with the user that is authorized with the time offset privilege based on an evaluation of information associated the user in a token received in association with the client request.

18. The system of claim 16, wherein the response processing component is further configured to select the second set, from the at least one second set, having an associated designated future time corresponding to the time offset value.

19. The system of claim 16, wherein the response processing component is further configured to select the second set, from the at least one second set, having an associated designated future time closest to the time offset value.

20. The system of claim 16, wherein the response processing component is further configured to bypass cache access operations of the system to obtain the second set of user interface elements.

\* \* \* \* \*